(12) United States Patent
Agarwala et al.

(10) Patent No.: US 6,681,270 B1
(45) Date of Patent: Jan. 20, 2004

(54) EFFECTIVE CHANNEL PRIORITY PROCESSING FOR TRANSFER CONTROLLER WITH HUB AND PORTS

(75) Inventors: Sanjive Agarwala, Richardson, TX (US); Iain Robertson, Bedfordshire (GB); David A. Comisky, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 478 days.

(21) Appl. No.: 09/713,563

(22) Filed: Nov. 15, 2000

Related U.S. Application Data

(60) Provisional application No. 60/169,369, filed on Dec. 7, 1999.

(51) Int. Cl.[7] .............................................. G06F 3/00
(52) U.S. Cl. ........................... 710/40; 710/33; 710/52; 709/102; 709/103
(58) Field of Search ............................... 710/2, 52, 33, 710/40; 709/102, 103, 238

(56) References Cited

U.S. PATENT DOCUMENTS

| | | | | |
|---|---|---|---|---|
| 5,764,895 A | * | 6/1998 | Chung | 709/250 |
| 5,923,654 A | * | 7/1999 | Schnell | 370/390 |
| 6,011,793 A | * | 1/2000 | Smith | 370/395.7 |
| 6,044,061 A | * | 3/2000 | Aybay et al. | 370/230 |
| 6,088,744 A | * | 7/2000 | Hill | 710/53 |
| 6,249,520 B1 | * | 6/2001 | Steely et al. | 370/368 |
| 6,304,578 B1 | * | 10/2001 | Fluss | 370/413 |
| 6,493,347 B2 | * | 12/2002 | Sindhu et al. | 370/401 |
| 6,516,442 B1 | * | 2/2003 | Wang et al. | 714/776 |
| 6,535,510 B2 | * | 3/2003 | Kalkunte et al. | 370/389 |
| 6,546,420 B1 | * | 4/2003 | Lemier et al. | 709/224 |

* cited by examiner

Primary Examiner—Jeffrey Gaffin
Assistant Examiner—Eron Sorrell
(74) Attorney, Agent, or Firm—Robert D. Marshall, Jr.; W. James Brady, III; Frederick J. Telecky, Jr.

(57) ABSTRACT

A data transfer controller with hub and ports uses an effective channel priority processing technique and algorithm. Data transfer requests are queued in a first-in-first-out fashion at the data source ports. Each data transfer request has a priority level for execution. In effective channel priority processing the priority level assigned to a source port is the greatest priority level of any data transfer request in the corresponding first-in-first-out queue. This techniques prevents a low priority data transfer request at the output of a source port queue from blocking a higher priority data transfer request further back in the queue. Raising the priority of all data transfer requests within a source port queue enables the low priority data transfer request to complete enabling the high priority data transfer request to be reached. Thus both the low priority data transfer request and the high priority data transfer request in the queue of a single port are serviced before intermediate priority data transfer requests at the output of other source port queues.

10 Claims, 6 Drawing Sheets

1

EFFECTIVE CHANNEL PRIORITY PROCESSING FOR TRANSFER CONTROLLER WITH HUB AND PORTS

This application claims priority under 35 USC §119(e)(1) of Provisional Application No. 60/169,369, filed Dec. 7, 1999.

TECHNICAL FIELD OF THE INVENTION

The technical field of this invention is digital signal processing and more particularly control of data transfers within a digital signal processing system.

BACKGROUND OF THE INVENTION

Digital signal processing (DSP) differs significantly from general purpose processing performed by micro-controllers and microprocessors. One key difference is the strict requirement for real time data processing. For example, in a modem application, it is absolutely required that every sample be processed. Even losing a single data point might cause a digital signal processor application to fail. While processing data samples may still take on the model of tasking and block processing common to general purpose processing, the actual data movement within a digital signal processor system must adhere to the strict real-time requirements of the system.

As a consequence, digital signal processor systems are highly reliant on an integrated and efficient direct memory access (DMA) engine. The direct memory access controller is responsible for processing transfer requests from peripherals and the digital signal processor itself in real time. All data movement by the direct memory access must be capable of occurring without central processing unit (CPU) intervention in order to meet the real time requirements of the system. That is, because the CPU may operate in a software tasking model where scheduling of a task is not as tightly controlled as the data streams require, the direct memory access engine must sustain the burden of meeting all real time data stream requirements in the system.

The early direct memory access has evolved into several successive versions of centralized transfer controllers and more recently into the transfer controller with hub and ports architecture. The transfer controller with hub and ports architecture is described in U.S. Pat. No. 6,496,740 claiming priority from U.K. Patent Application No. 9909196.9 filed Apr. 10, 1999 entitled "TRANSFER CONTROLLER WITH HUB AND PORTS ARCHITECTURE".

A first transfer controller module was developed for the TMS330C80 digital signal processor from Texas Instruments. The transfer controller consolidated the direct memory access function of a conventional controller along with the address generation logic required for servicing cache and long distance data transfer, also called direct external access, from four digital signal processors and a single RISC (reduced instruction set computer) processor.

The transfer controller architecture of the TMS330C80 is fundamentally different from a direct memory access in that only a single set of address generation and parameter registers is required. Prior direct memory access units required multiple sets for multiple channels. The single set of registers, however, can be utilized by all direct memory access requesters. Direct memory access requests are posted to the transfer controller via set of encoded inputs at the periphery of the device. Additionally, each of the digital signal processors can submit requests to the transfer controller. The external encoded inputs are called "externally initiated packet transfers" (XPTs). The digital signal processor initiated transfers are referred to as "packet transfers" (PTs). The RISC processor could also submit packet transfer requests to the transfer controller.

The transfer controller with hub and ports introduced several new ideas concepts. The first was uniform pipelining. New digital signal processor devices containing a transfer controller with hub and ports architecture have multiple external ports, all of which look identical to the hub. Thus peripherals and memory may be freely interchanged without affecting the hub. The second new idea is the concept of concurrent execution of transfers. That is, up to N transfers may occur in parallel on the multiple ports of the device, where N is the number of channels in the transfer controller with hub and ports core. Each channel in the transfer controller with hub and ports core is functionally just a set of registers. This set of registers tracks the current source and destination addresses, the word counts and other parameters for the transfer. Each channel is identical, and thus the number of channels supported by the transfer controller with hub and ports is highly scalable.

Finally the transfer controller with hub and ports includes a mechanism for queuing transfers up in a dedicated queue memory. The TMS320C80 transfer controller permitted only was one transfer outstanding per processor at a time. Through the queue memory provided by the transfer controller with hub and ports, processors may issue numerous transfer requests up to the queue memory size before stalling the digital signal processor.

SUMMARY OF THE INVENTION

The transfer controller with hub and ports of this invention is an improvement over that described in U.S. Pat. No. 6,496,740 claiming priority from U.K. Patent Application No. 9909196.9 filed Apr. 10, 1999 entitled "TRANSFER CONTROLLER WITH HUB AND PORTS ARCHITECTURE". The improvement of this invention is effective channel priority processing.

The effective channel priority processing of this invention is the solution to the task of monitoring and arbitration of conflicting transfers that could cause major performance degradation if only the simple channel priority assigned determined which transfer should proceed first. The technique detailed here acts to raise the effective channel priority of a low priority transfer task which is blocking the completion of a higher priority transfer task.

This conflict comes about when both the lower priority channel and the higher priority channel are accessing data from the same port, but the lower priority task was initiated on an earlier processor cycle and hence is at the front of the queue for that port. Effective channel priority processing promotes the first task in the queue of a given port to the highest priority level represented by tasks on that queue.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
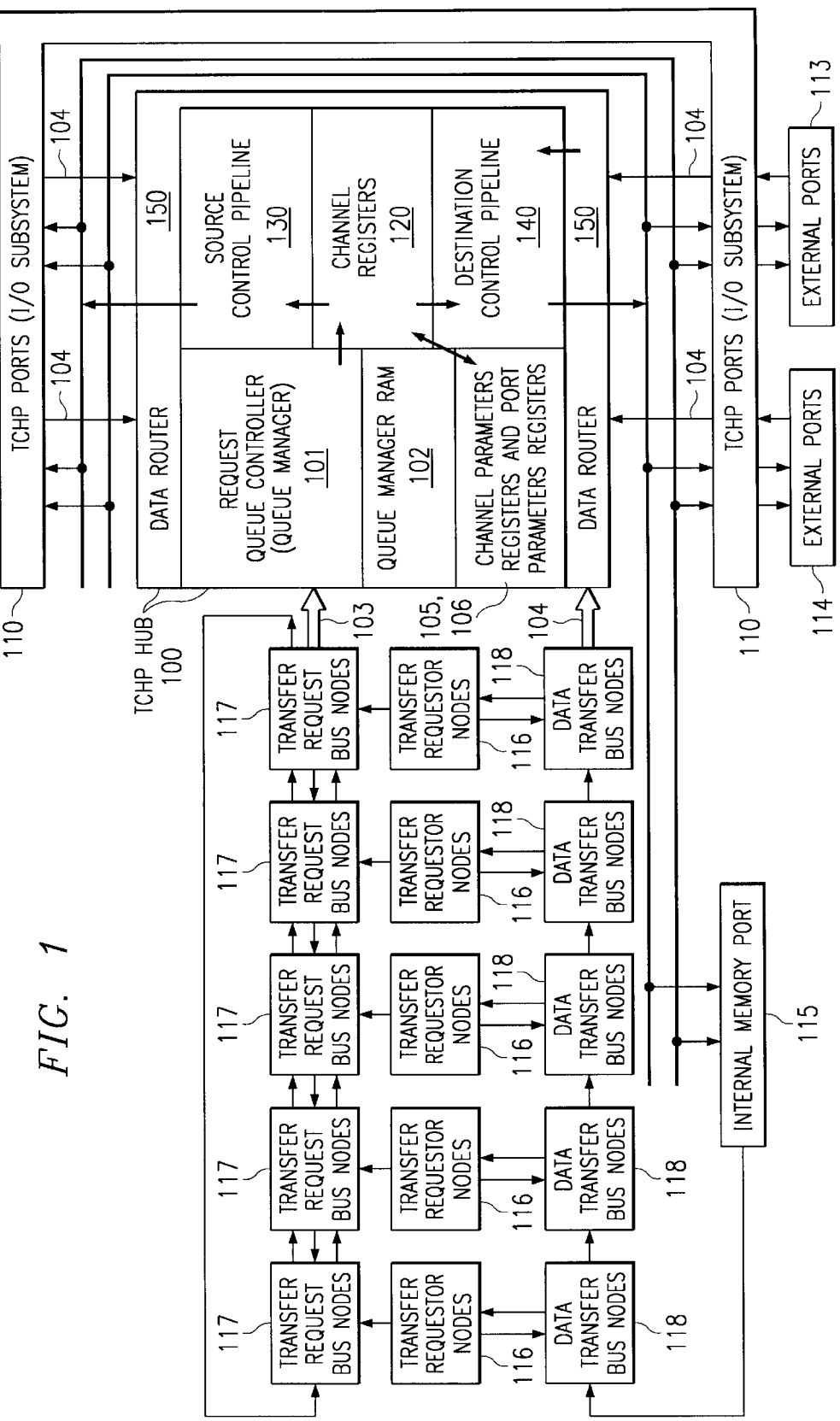
FIG. 1 illustrates in a functional block diagram the basic principal features of the transfer controller with hub and ports and related functions.

The transfer controller with hub and ports architecture is optimized for efficient passage of data throughout a digital signal processor chip. FIG. 1 illustrates a block diagram of the principal features of the transfer controller with hub and ports. It consists of a system of a single hub 100 and multiple ports 111 through 115.

The transfer controller with hub and ports functions in conjunction with a transfer request bus having a set of nodes 117, which bring in transfer request packets at input 103. These transfer request bus nodes individually receive transfer requests packets from transfer requesters 116 which are processor-memory nodes or other on-chip functions which send and receive data.

Secondly, the transfer controller uses an additional bus, the data transfer bus having a set of nodes 118, to read or write the actual data at the requester nodes 116. The data transfer bus carries commands, write data and read data from a special internal memory port 115 and returns read data to the transfer controller hub via the data router 150 at inputs 104.

The transfer controller has, at its front-end portion, a request queue manager 101 receiving transfer requests in the form of transfer request packets at its input 103. Request queue manager 101 prioritizes, stores and dispatches these as required.

Request queue manager 101 connects within the transfer controller hub unit 100 to the channel request registers 120 which receive the data transfer request packets and process them. In this process, request queue manager 101 first prioritizes the transfer request packets and assigns them to one of the N channel request registers 120. Each of the N channel request registers 120 represents a priority level.

If there is no channel available for direct processing of the transfer request packet, it is stored in the queue manager memory 102. Queue manager memory 102 is preferably a random access memory (RAM). The transfer request packet is then assigned at a later time when a channel becomes available. The channel registers interface with the source control pipeline 130 and destination control pipeline 140 which effectively are address calculation units for source (read) and destination (write)operations.

Outputs from these pipelines are broadcast to M ports through the transfer controller ports I/O subsystem 110. I/O subsystem 110 includes a set of hub interface units, which drive the M possible external ports units. Four such external ports are shown in FIG. 1 as external ports 111 through 114. The external ports units (also referred to as application units) are clocked either at the main processor clock frequency or at a different external device clock frequency. The external device clock frequency may be lower than or higher than the main processor clock frequency. If a port operates at its own frequency, synchronization to the core clock is required.

As an example of read-write operations at the ports, consider a read from external port node 112 followed by a write to external port node 114. First source control pipeline 130 addresses port 112 for a read. The data is returned to the transfer controller hub through the data router 150. On a later cycle the destination control pipeline 140 addresses port 114 and writes the data at port 114. External ports as described here do not initiate transfer requests but merely participate in reads and writes requested elsewhere on the chip. Read and write operations involving the processor-memory (transfer requestors) nodes 116 are initiated as transfer request packets on the transfer request bus 117. The queue manager 101 processes these as described above. On a later cycle a source pipeline output (read command/ address) is generated which is passed at the internal memory port to the data transfer bus 118 in the form of a read. This command proceeds from one node to the next in pipeline fashion on the data transfer bus. When the processor node addressed is reached, the read request causes the processor-memory node to place the read data on the bus for return to the data router 150. On a later cycle, a destination pipeline output passes the corresponding write command and data to the internal memory port and on to the data transfer bus for writing at the addressed processor node.

The channel parameter registers 105 and port parameters registers 106 hold all the necessary parametric data as well as status information for the transfer controller hub pipelines to process the given transfer. Both pipelines share some of the stored information. Other portions relate specifically to one pipeline or the other.

Figure 2:
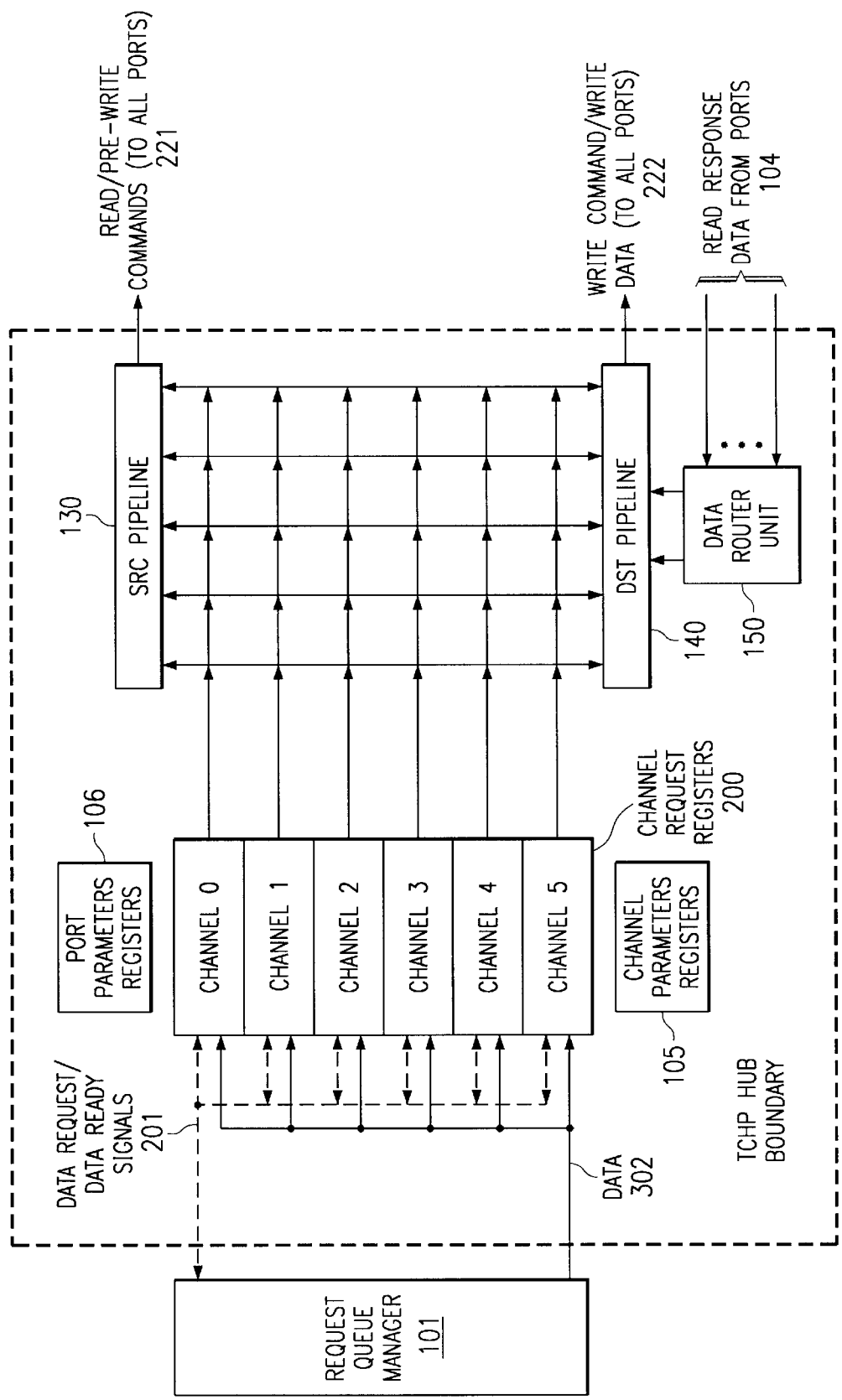
FIG. 2 illustrates the queue manager interface to the transfer controller hub unit.

FIG. 2 illustrates the interface of request queue manager 101 to the transfer controller hub unit boundary and particularly the request queue manager communications with the channel request registers 200, channel parameter registers 105 and port parameters registers 106. Channel parameters registers 105 and port parameters registers 106 store critical data regarding for example, types of transfers, mode information, status, and much other information critical to the transfer process.

Channel request registers 200 pass information used in the source control pipeline 130 for generation of the read/pre-write commands 221. Similarly, channel request registers 200 pass information used in the destination control pipeline 140 for the generation of write command/write data words 222. Read response data 104 from the ports is returned to the destination pipeline via the data router 150.

Figure 3:
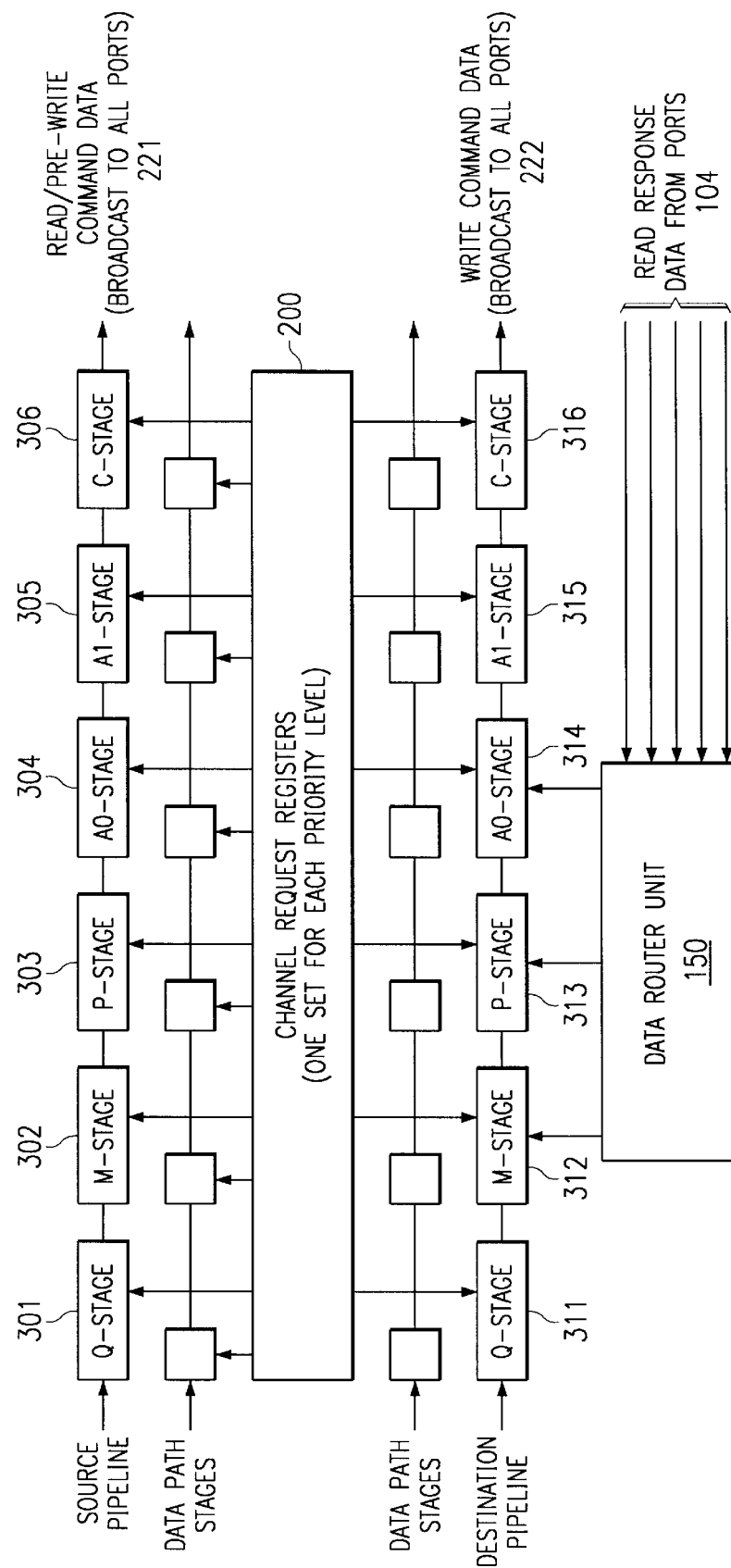
FIG. 3 illustrates the transfer controller pipelines.

FIG. 3 illustrates the possible pipelines in a transfer controller implementation. Table 1 shows the particular tasks performed during the pipeline stages in the preferred embodiment. In specific implementations, one or more stages may be combined but the tasks for the individual pipeline stages are essentially as shown in Table 1.

TABLE 1

| Pipeline Stage | Function |
| --- | --- |
| Q | Interrogates state of queues within ports |
| M | Maps port ready signals to channels |
| P | Prioritize highest priority channel with ready ports |
| A0 | First half of address update cycle |
| A1 | Second half of address update cycle |
| C | Issues command to ports |

The channel request registers 200 pass information used in the source pipeline stages 301 to 306 for generation of the read/pre-write commands 221. Similarly, the channel request registers 200 pass information used in the destination pipeline stages 311 to 315 for the generation of write command/write data words 222. Read response data 104 from the ports is returned to the destination pipeline via the data router 150.

Figure 4:
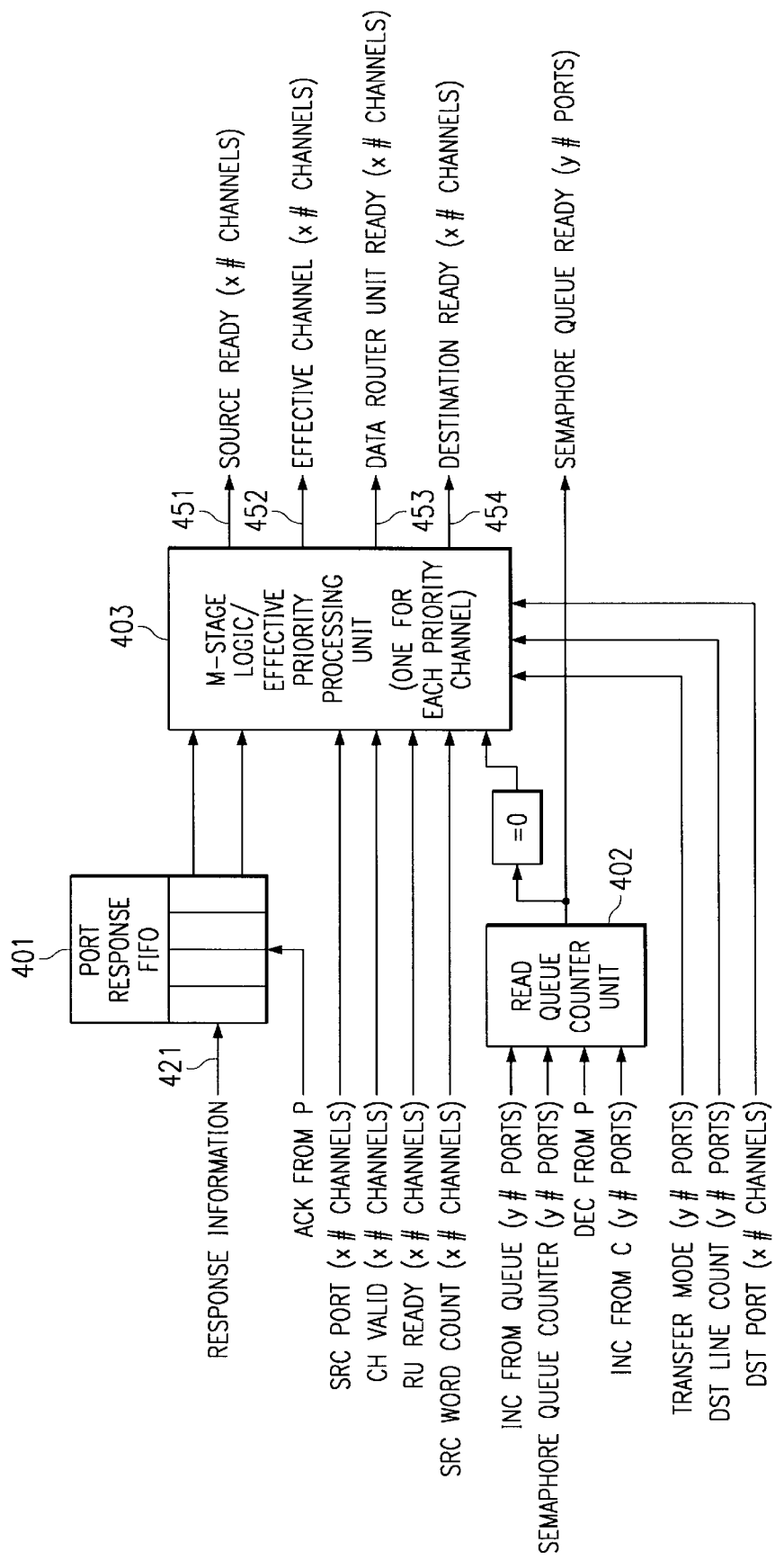
FIG. 4 illustrates the pipeline M-stage of the transfer controller, which contains the effective channel priority processing hardware.

FIG. 4 illustrates the pipeline M-stage. The pipeline M-stage and P-stage will play the most significant part in carrying out the effective channel priority processing technique of this invention. It is helpful to consider the make-up of the M-stage in further detail. The pipeline M-stage interfaces with the ports. These ports send response information 421 of completed reads which need to be serviced by the transfer controller. This information is then sent to the port response FIFO 401 in the pipeline M-stage, then prioritized in pipeline P-stage. The pipeline M-stage is responsible for the mapping from port to channel. Note channel related output signals 451 through 454. The pipeline P-stage evaluates if a channel is ready and prioritizes the command.

The pipeline M-stage maps the port information on a per channel basis. This is then analyzed and prioritized in the pipeline P-stage to select the channel to process further. FIG. 4 illustrates the signal information that is generated for each channel from the received port information. The source ready signal 451 flags when the source port for the channel has read data ready for the transfer controller to process. The data router unit ready signal, 453 similarly flags when data routing unit 150 has left over read data for the channel that needs to be processed. The destination ready signal 454 flags when the destination port for the channel has available queue space (internal memory port space). This is only taken into account for internal memory port transfer. The effective channel signal 452 is the channel number of the channel that should be effectively raised to the priority of the present channel.

There are three main components of the pipeline M-stage. The port response FIFO 401 holds the response information from the ports inside the transfer controller hub. The pipeline M-stage also includes read queue counters 402 and effective priority processing unit 403.

A multiple-cycle delay occurs between the time of a new response from a port denoting "data ready" and the time that the transfer controller hub can send a acknowledgment (ACK) back to the port signifying that the hub will process the data. In order to be able to process a new response every clock even with this multiple-cycle ACK delay, multiple-entry port response FIFO 401 is used to keep track of the last three responses from the port that have not generated an ACK signal. In port response FIFO 401, only the first response may be serviced. Because of the ACK delay, one more response may come from the port before it receives a signal that the first response could not be processed, thus stalling the port. Port response FIFO 401 advances when the pipeline M-stage and P-state respond indicating which port, if any, will receive the ACK in the next cycle.

Both the destination pipeline and the source pipeline use read queue counters 402. Locally, the counter is decremented when the port is selected for an operation in the pipeline M-stage and P-state. This counter is incremented when receiving a signal sent indicating that a queue entry was emptied.

The ports and port response FIFO 401 can only be serviced in order. Thus there is a need for the ability to raise the effective priority when the data belonging to a low priority channel is blocking a port from reading and processing the data for a higher priority channel. The functional block which handles this operation is a part of the pipeline M-Stage effective priority processing unit 403.

Figure 5:
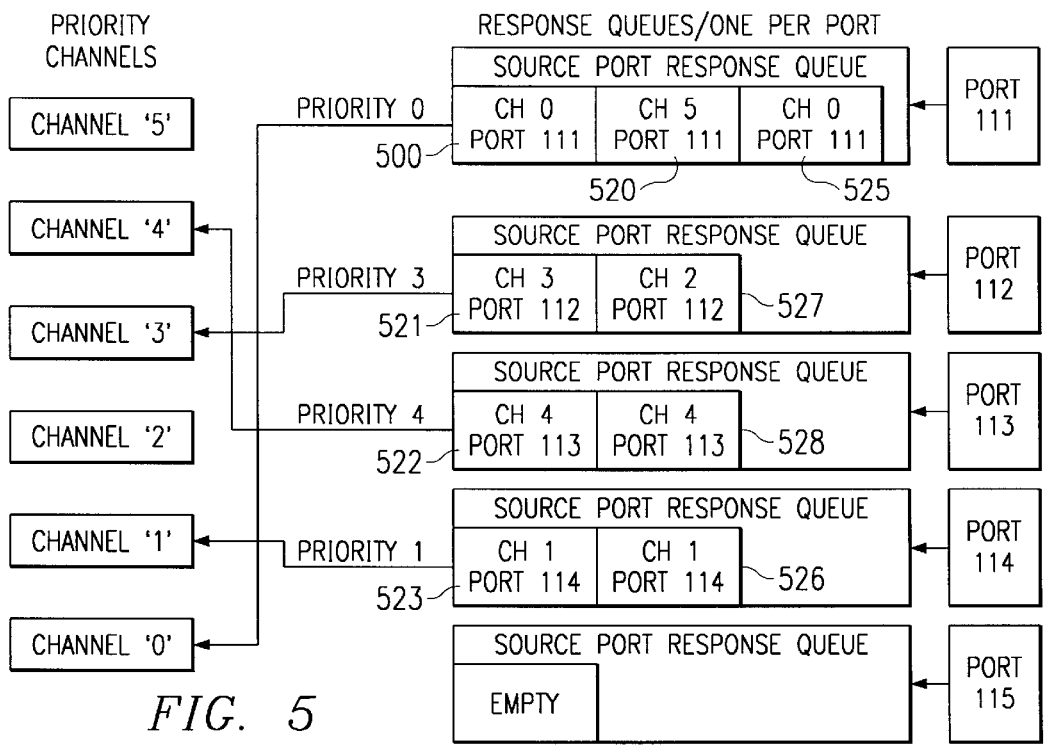
FIG. 5 illustrates processing following only the simple channel priority assigned without the effective channel priority technique.

FIG. 5 illustrates an example of effective priority processing. Consider a possible scenario of two transfers in queue where an arbitration of priorities can make a significant difference in processor performance. Suppose two channels (say port 5, with highest priority and port 0, with lowest priority) are using the same source port, and the data at the front of the response queue is from the lower priority channel (0). If there was no effective priority processing, such as indicated in FIG. 5, then the following could happen. If other ports in the system have data available at the front of their response queues for any of the channels 4 through 1, as is the case for ports 112 through 115 in the example illustrated in FIG. 5, then these other ports will get serviced ahead of the port with data for channel 0.

This is acceptable as far as channel 0 is concerned. Unfortunately this means that channel 5, which is supposed to be high priority, is actually, getting low priority performance. This is because the channel 5 data transfer request 520, which is waiting to be serviced, is blocked behind channel 0 data transfer 500. The data transfers 521 through 524, which reside at the front of each respective source port response queue, are assigned the priority of that specific channel. These are each assigned a priority ahead of channel 0 data transfer 500. Thus ordinarily, channel 5 data transfer request 520 would be services following service of the lower priority data transfers 521 through 524. The following remedy, which allows for dynamic adjustments to the effective priority of a channel, is implemented in the improved transfer controller of this invention.

In effective channel priority processing, the source ports being used by the currently active channels are examined on a cyclic basis to determine the highest priority channel using each source port response queue. For the purposes of prioritization in the destination pipeline, all channels using a port are then assigned the priority level of the highest priority channel using that port. This priority assignment need only be revised when a channel either completes or starts a transfer. This means that several cycles can be taken to recompute the effective priority levels in order to avoid complicated multiple compares and other operations which tend to introduce speed degradation. Note that this approach does not change the order in which data is extracted from a given source port response queue. This is still a strict first-in-first-out sequence. It simply ensures that high priority data does not become inaccessible for excessive cycles behind low priority data.

Figure 6:
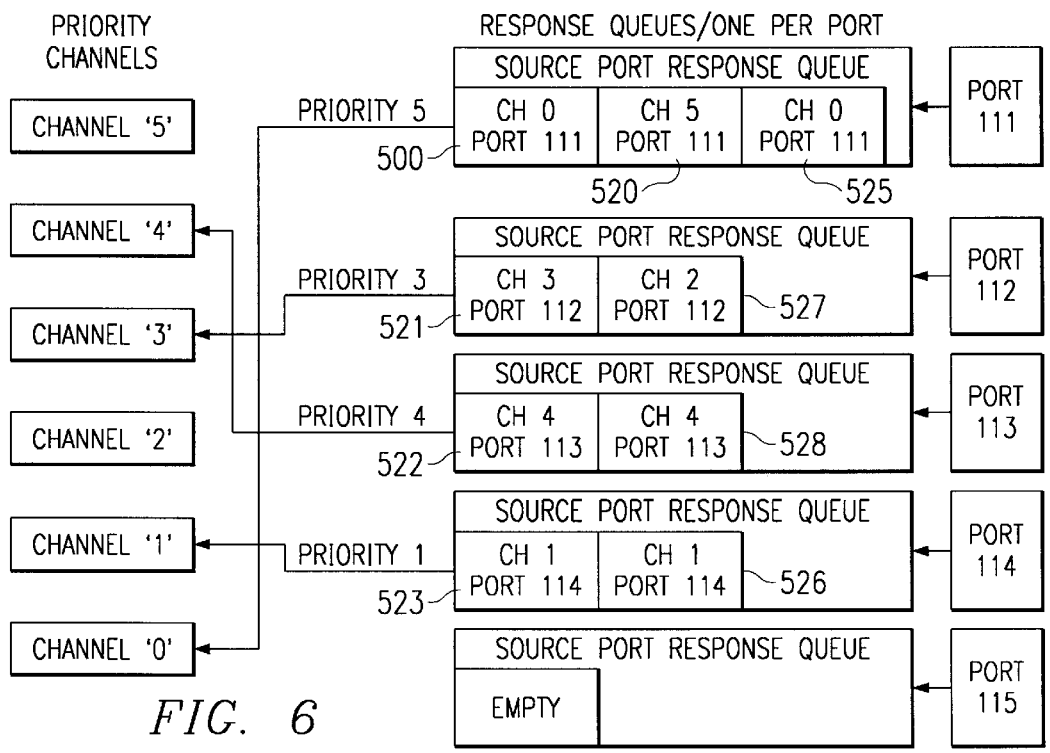
FIG. 6 illustrates processing with the effective channel priority technique acting to modify priorities.

FIG. 6 illustrates the results of effective channel priority processing for the same example of transfers as illustrated in FIG. 5. Note that data transfer 500 has been promoted to priority 5 (highest priority) because there is in that source port response queue a true priority 5 data transfer request 520 awaiting service. The other data transfers 521 through 524, which reside at the front of each respective source port response queues are now also assigned the priority of the highest priority channel transfer present in that particular source port response queue. In this example data transfers 521, 522, and 523 are the highest priority in their respective port response queues and thus no promotion takes place.

Figure 7:
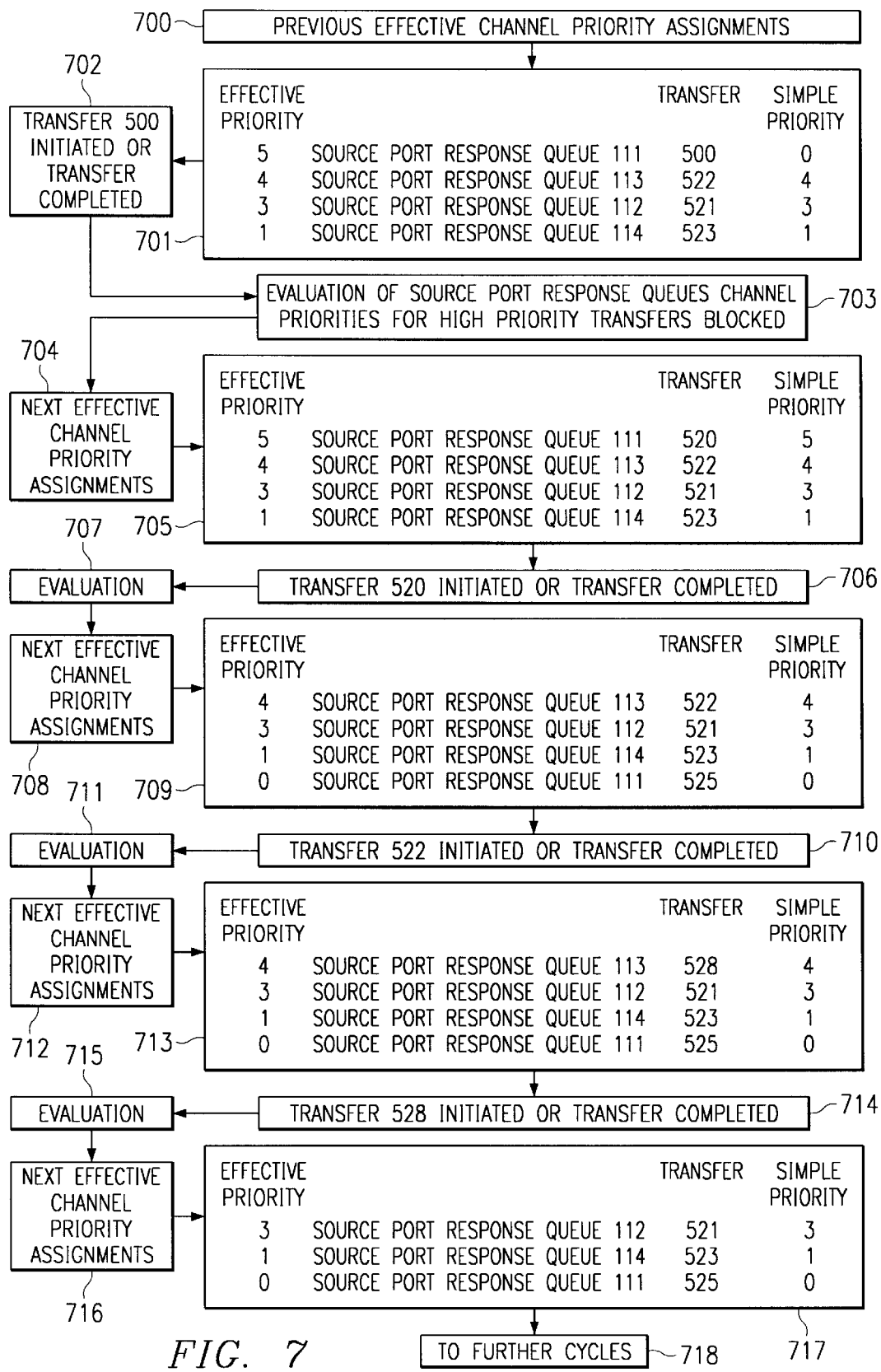
FIG. 7 illustrates in flow chart form, a sequence of effective priority updates in the process of servicing a series of transfers in queue.

FIG. 7 illustrates the result of effective channel priority processing for this particular set of example transfers in the five source port response queues. Block 700 starts with the previous effective channel priority assignments shown in detail in block 701 where simple priority is contrasted with effective priority. For example data transfer 500 is shown with simple priority "0" and effective priority level elevated to "5". Transfers 522, 521, and 523 retain their simple priorities. The result of completing transfer 500 in block 702 is that priorities are re-evaluated in block 703, and new effective priority assignments are carried out in block 704 and are shown in detail in block 705. The flow chart shows subsequent transfers completed in blocks 706, 710, and 714 for transfers 520, 522, and 528 respectively.

Because no new additional transfers are shown to have been requested during this sequence, source port response queue 113 empties after data transfer 528 in block 714. The individual blocks 705, 709, 713 and 717 show how the effective priority adjustments could result in the higher priority transfers being completed despite their place in queue behind lower priority transfers.

What is claimed is:

1. A data transfer controller comprising:

a plurality of ports;

a plurality of first-in-first-out source port data transfer request queues, each of said plurality of first-in-first-out source port data transfer request queues corresponding to one of said plurality of ports and adapted for storing data transfer requests specifying said corresponding port as data source, each data transfer request specifying a data source, a data destination, a data quantity to be transferred and a priority level;

a data transfer hub connected to said plurality of ports and to said plurality of first-in-first-out source port data transfer request queues, said data transfer hub receiving a next data transfer request from each of said first-in-first-out source port data transfer request queues, prioritizing and dispatching said data transfer requests between ports, said data transfer hub further controlling data transfer from a source port corresponding to said data source to a destination port corresponding to said data destination in a quantity corresponding to said data quantity to be transferred of a currently executing data transfer request in a source port priority corresponding to said priority level; and said data transfer hub further setting said source port priority of a next data transfer request from each of said first-in-first-out source port data transfer request queues equal to the highest priority of any data transfer request stored in said corresponding first-in-first-out source port memory transfer request queue.

2. The data transfer controller of claim 1, wherein:

said data transfer hub setting said source port priority for all ports upon completion of each data transfer request.

3. The data transfer controller of claim 1, further comprising:

an internal memory; and at least one of said plurality of ports is connected to said internal memory.

4. The data transfer controller of claim 1, wherein:

at least one of said plurality of ports is adapted for connection to an external memory.

5. The data transfer controller of claim 1, wherein:

at least one of said plurality of ports is adapted for connection to an external peripheral.

6. A data processing system comprising:

a plurality of data processors, each data processor capable of generating data transfer requests, each data transfer request specifying a data source, a data destination, a data quantity to be transferred and a priority level;

a plurality of ports;

a plurality of first-in-first-out source port data transfer request queues, each of said plurality of first-in-first-out source port data transfer request queues corresponding to one of said plurality of ports and adapted for storing data transfer requests specifying said corresponding port as data source, each data transfer request specifying a data source a data destination, a data quantity to be transferred and a priority level;

a data transfer hub connected to said plurality of data processors, said plurality of ports and to said plurality of first-in-first-out source port data transfer request queues, said data transfer hub receiving a next data transfer request from each of said first-in-first-out source port data transfer request queues, prioritizing and dispatching said data transfer requests between ports, said data transfer hub further controlling data transfer from a source port corresponding to said data source to a destination port corresponding to said data destination in a quantity corresponding to said data quantity to be transferred of a currently executing data transfer request in a source port priority corresponding to said priority level; and said data transfer hub further setting said source port priority of a next data transfer request from each of said first-in-first-out source port data transfer request queues equal to the highest priority of any data transfer request stored in said corresponding first-in-first-out source port memory transfer request queue.

7. The data processing system of claim 6, wherein:

said data transfer hub setting said source port priority for all ports upon completion of each data transfer request.

8. The data processing system of claim 6, further comprising:

a plurality of internal memories, each of said plurality of internal memories corresponding to one of said data processors;

one of said plurality of ports is connected to said plurality of internal memories.

9. The data processing system of claim 6, wherein:

at least one of said plurality of ports is adapted for connection to an external memory.

10. The data processing system of claim 6, wherein:

at least one of said plurality of ports is adapted for connection to an external peripheral.

* * * * *